United States Patent [19]

Yasuda et al.

[11] Patent Number: 4,677,144

[45] Date of Patent: Jun. 30, 1987

[54] EPOXY RESIN COMPOSITION

[75] Inventors: Kazuo Yasuda; Toshiharu Ando; Yoshifumi Itabashi, all of Amagasaki, Japan

[73] Assignee: Mitsubishi Denki Kabushiki Kaisha, Tokyo, Japan

[21] Appl. No.: 846,103

[22] Filed: Mar. 31, 1986

[51] Int. Cl.$^4$ .................... C08K 3/36; C08K 3/22
[52] U.S. Cl. .................... 523/456; 523/400; 523/466; 525/523
[58] Field of Search ............... 523/457, 466; 525/523; 524/400

[56] References Cited

U.S. PATENT DOCUMENTS 3,530,087  9/1970  Hayes et al. .................... 523/457

FOREIGN PATENT DOCUMENTS 53-31904  9/1978  Japan .

OTHER PUBLICATIONS

Lee et al.; Handbook of Epoxy Resins; McGraw-Hill Book Co.; 1967; pp. 21-38 & 21-39.

*Primary Examiner*—Lewis T. Jacobs
*Attorney, Agent, or Firm*—Oblon, Fisher, Spivak, McClelland & Maier

[57] ABSTRACT

An epoxy resin composition consisting essentially of a heat-melted mixture obtained by mixing under heat 100 parts by weight of an epoxy resin having an epoxy equivalent of 200 or below and 0.5 to 10 parts by weight of polysulfone resin; a curing agent; and an inorganic filling material.

7 Claims, 1 Drawing Figure

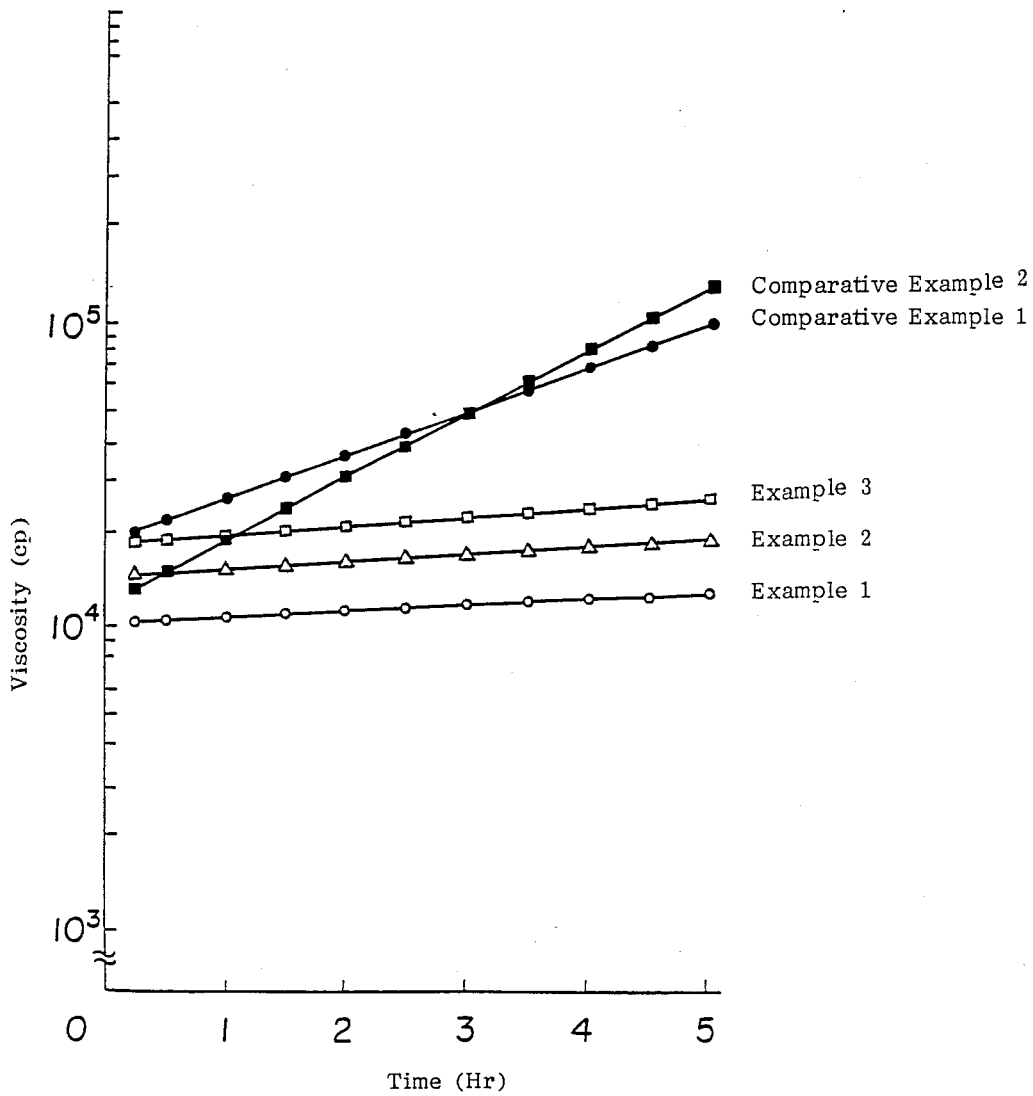

EPOXY RESIN COMPOSITION

This invention relates to an epoxy resin composition which is suitable for producing molded insulating products as component parts of various electrical apparatuses and appliances.

Cured products composed of epoxy resin and various acid anhydrides are highly excellent in their electrical, mechanical and chemical properties, hence they are widely used as the epoxy resin molded insulating products for the manufacture of electrical apparatuses and appliances as well as power transmission and distribution apparatuses and appliances.

As a method for shortening mold-releasing time of the epoxy resin molded insulating product from a metal mold with a view to improving productivity of such epoxy resin molded insulating product, there has so far been known generally "pressure gelating method". This pressure gelating method comprises steps of maintaining a mixture of the epoxy resin and other ingredients in a pressure tank at a low temperature, and then, at the time of molding, pouring the mixture of the resin composition directly into the metal mold kept at a higher temperature than the resin mixture through a pipeline and a molding head, while maintaining the mold under pressure so as to compensate curing and shrinking of the resin, and to cure the molding material in a short time, thereby obtaining the required products. In this case, the mixture of the epoxy resin to be used in the pressure gelating method is required to have a low viscosity in the pressure tank at a low temperature, a long useful working time, and further a rapid curing speed whthin the metal mold at a high temperature.

General characteristics of epoxy resins are such that those having a low molecular weight indicate a low viscosity even at a low temperature, on account of which they have an extremely large coefficient of contraction due to curing, hence the cured products tend to readily bring about various deficiencies such as loss, cracks, and so forth, while those having quick curing reactivity at a high temperature indicate relatively fast curing reaction even at a low temperature, hence their useful working time becomes shorter.

To solve these problems, there have generally been taken various measures such that, for preventing the cured products from such loss or cracks to occur during the curing steps of the above-mentioned epoxy resins of low molecular weight, the pressure gelating method is adopted, and, for prolonging the useful working time of the epoxy resin composition having high reactivity at a high temperature, a latent promoter is used. However, the low molecular weight epoxy resins indicating a low viscosity at a low temperature are inferior in their heat shock resisting property to that of the solid or high viscosity liquid epoxy resin which are well used in the ordinary molding method other than the pressure gelating method.

As the method for improving the heat shock resisting property of the epoxy resins having a low viscosity, there has so far been known a method, in which a flexibility imparting agent such as, for example, high molecular weight oligomers having a molecular weight of from 500 to 5,000 or so and containing polyester, polyether, polybutadiene, and so forth in the principal chain thereof is added to the epoxy resin. This method, however, considerably increases viscosity of the epoxy resin with increase in the adding quantity of such flexibility imparting agent, and, further, its heat resistant property also decreases remarkably. On the contrary, when the adding quantity of the flexibility imparting agent is small, the heat shock resisting property of the epoxy resin hardly improves.

In connection with this, such flexibility imparting agent as that which does not so much increase viscosity of the resin mixture (such as high molecular weight oligomers containing therein polyamide in its principal chain) has high reactivity, hence the useful working time of the epoxy resin becomes disadvantageously short.

Since, in the pressure gelating method, the epoxy resin mixture of a low viscosity at a low temperature is poured into a metal mold kept at a temperature higher than that of the resin mixture, which inevitably causes the viscosity of the resin mixture to decrease temporarily in the metal mold to bring about sedimentation of a filling material, it has the point of problem such that the resulting molded product has poor external appearances such as impression of flow-mark, etc. or no cured product having uniform properties can be obtained, and others. In particular, when alumina powder having high specific gravity is used as the filling material, the above-noted problems emerge conspicuously.

In addition, the low viscosity epoxy resin to be applied to the pressure gelating method as mentioned in the foregoing are inferior to the heat shock resistant property, the improvement in which would bring about a new problem of lowered heat resistant property.

The present invention has been made with a view to solving such point of problems as mentioned in the preceding, and aims at providing an improved epoxy resin composition having adequate rigidity and flexibility in the molecular chain thereof, having excellent heat resistant property and heat shock resisting property, and not causing sedimentataion of the filling material for the resin compositon.

The expoxy resin composition according to the present invention is characterized in that it consists essentially of: a heat-melted mixture obtained by mixing under heat 100 parts by weight of an epoxy resin having an epoxy equivalent of 200 or lower; and 0.5 to 10 parts by weight of polysulfone resin to be represented by the following formula (I); a curing agent; and an inorganic filler,

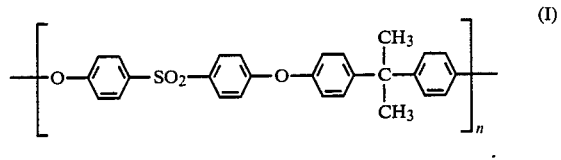
(I)

(where: n is an integer of from 50 to 80).

More specifically, the curing agent of the present invention consists essentially of a condensation mixture of 100 parts by weight of a polybasic carboxylic acid anhydride; and 40 to 60 parts by weight of bisphenol A having the formula (II):

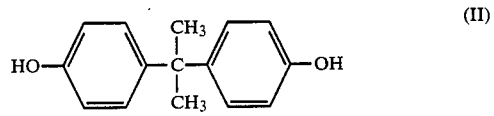
(II)

The present invention will now be described in specific details hereinbelow with reference to preferred examples of obtaining the epoxy resin composition with improved heat resistant property and heat shock resisting property, when read in conjunction with the accompanying drawing, in which the single FIG. 1 is a graphical representation showing changes with lapse of time in viscosity of the epoxy resin composition prepared in Examples 1 to 3 of the present invention and Comparative Examples 1 and 2.

As the epoxy resin to be used for the present invention, the following are exemplified: bisphenol A type epoxy resin, bisphenol F type epoxy resin, phenol-novolac type epoxy resin, cresol-novolac type epoxy resin, cycloaliphatic diglycidyl ester type epoxy resin, cycloaliphatic epoxy resin containing the epoxy group in its ring, epoxy resin containing spiro ring therein, hydantoin epoxy resin, and so forth. These epoxy resins may be used singly or in combination of two or more of them. Of these epoxy resins, those having the epoxy equivalent of 200 or lower are preferable on account of their being in liquid form at a low temperature (20° C. to 80° C.).

The polysulfone resin for use in the present invention, which is repesented by the following formula (I) should preferably have its integer n in the range of from 50 to 80 from the standpoint of its excellent mechanical property, heat resistant property, electrical property, water-resisting property, and so on.

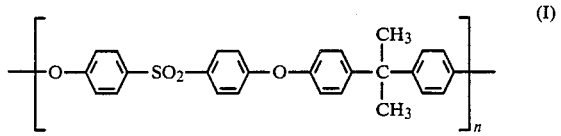

(I)

The heat-melted mixture can be obtained by sufficiently mixing 100 parts by weight of the above-mentioned epoxy resin and 0.5 to 10 parts by weight of polysulfone resin to be represented by the above formula (I) in an inactive gas atmosphere such as nitrogen gas, etc. at a heating temperature of from 110° C. to 180° C. to render the same into a uniform composition.

When the quantity of the polysulfone resin of the above formula (I) is below 0.5 part by weight, it would be difficult to reduce sedimentation of the filling material in this heat-melted mixture. On the contrary, when its quantity exceeds 10 parts by weight, viscosity of the mixture with the curing agent and the inorganic powder as the filling material surpasses 100,000 cp at a low temperature, which makes it difficult to pour the mixture into the mold even by way of the pipeline, hence it is not suitable for use as the resin mixture in the pressure gelating method.

The curing agent to be used for the present invention is a condensation mixture to be obtained by sufficiently mixing, into a uniform liquid, 100 parts by weight of polybasic carboxylic acid anhydride and 40 to 60 parts by weight of bisphenol A to be represented by the following formula (II) in an inactive gas atmosphere such as nitrogen gas at a heating temperature of from 100° C. to 150° C.

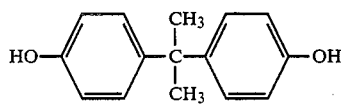

(II)

As the polybasic carboxylic acid anhydride, there may be exemplified hexahydrophthalic anhydride, methylhexahydrophthalic anhydride, tetrahydrophthalic anhydride, methyltetrahydrophthalic anhydride, and so forth. These polybasic carboxylic acid anhydrides may be used singly or in combination of two or more of them. In this case, there may also be added metal salts of organic carboxylic acid, tertiary amines, and so forth together with the above-mentioned polybasic carboxylic acid anhydride.

When the adding quantity of bisphenol A to be represented by the above formula (II) is below 40 parts by weight, the resulting cured product of the epoxy resin composition would increase its deflection temperature under flexural load (HDT), while it would reduce the heat shock resisting property. On the contrary, when the adding quantity of bisphenol A exceeds 60 parts by weight, viscosity of the mixture with the epoxy resin and the inorganic filling material at a low temperature surpasses 100,000 cp with the consequent difficulty in its pouring into the mold through the pipeline, inability to adopt the pressure gelating method, and decrease in the deflection temperature under flexural load (HDT) of the cured product, which are not preferable.

As the inorganic powder to be used as the filler in the present invention, any kind of such inorganic powder may be used, if it does not lower the electrical and mechanical properties of the cured product of the epoxy resin composition. Examples of such inorganic powder are: alumina powder, hydrated alumina powder, quartz powder, fused quartz powder, and so forth. Of these, use of alumina powder having high specific gravity produces a remarkable effect of preventing it from sedimenting.

The method for manufacturing the molded product using the epoxy resin composition according to the present invention comprises mixing, at a temperature of from 20° C. to 80° C., the heat-melted mixture of the above-mentioned epoxy resin having its epoxy equivalent of 200 or below and the polysulfone resin of the above formula (I), the curing agent, and the inorganic filling material, the mixing being effected preferably under a reduced pressure.

In this case, it is preferable that 30 to 150 parts by weight of the curing agent and 56 to 380 parts by weight of the inorganic filling material be added to 100 parts by weight of the heat-melted mixture.

The epoxy resin composition is directly poured into a metal mold which has been preheated to a temperature in a range of from 90° C. to 160° C. through a pipeline, and thereafter the pressure in the mold is maintained at its gauge value of from 0.5 to 5.0 kg/cm² for a time period of from 1 to 30 minutes to complete the curing, thereby obtained a desired product.

The reaction accelerator to be added to the epoxy resin composition may be chosen from, for example, organic carboxylic acid metal salts, tertiary amines, boron trifluoride-amine complex, imidazoles, and so forth, although the reaction accelerator is not limited to these species alone. The adding quantity of the accelerator should preferably be so adjusted that the curing may be completed in a time period of from about 1 to 30 minutes at the metal mold temperature of from 90° C. to 160° C.

Furthermore, the epoxy resin composition according to the present invention may be added with a coloring agent, a coupling agent, internal mold releasing agent, etc. to an extent such that these additives may not lower various characteristics of the resin composition such as viscosity, long useful working time, rapid curing speed of the resin mixture, as well as sedimentation, color irregularity, deflection temperature under flexural load, heat shock resisting property, etc. of the cured product.

In the following, the epoxy resin composition of the present invention will be explained in further details with reference to the preferred examples thereof in conjunction with comparative examples, although the present invention is not limited to these examples alone.

EXAMPLE 1

100.5 parts by weight of the heat-melted mixture obtained by melting under heat 100 parts by weight of GY-260 (a tradename for an epoxy resin produced and marketed by Ciba-Geigy AG) and 0.5 parts by weight of P-1700 (a tradename for a polysulfone resin produced and marketed by Nissan Chemical·Industries Co. Ltd.); 95 parts by weight of a condensation mixture obtained by mixing 65 parts by weight of HY-917J (a tradename for a curing agent produced and marketed by Ciba-Geigy AG) and 30 parts by weight of bisphenol A (a product of Mitsui-Tohatsu Chemical Co. Ltd.); 1 part by weight of zinc octylate (a product of Nakarai Chemical and Pharmaceutical Co. Ltd.) as the curing promotor; and 510 parts by weight of alumina powder as the filling material were stirred at 60° C. under reduced pressure to thereby prepare an epoxy resin composition. The initial viscosity, the useful working time, the time for gelation, and the viscosity change with lapse of time of the thus obtained composition were measured in accordance with the following methods. The results are shown in the following Table 1 and the graphical representation in the single FIG. 1 of the accompanying drawing.

By using the composition, a crack resistance test piece, an HDT test piece, and a sedimentation property test piece were prepared (the composition was geled at 150° C. and then cured at 130° C. for 24 hours). The test pieces were evaluated in the following methods. The results are shown in Table 1 below.

Initial viscosity

The epoxy resin composition was stirred under reduced pressure at 60° C. for 40 minutes, after which the viscosity was measured.

Useful working time

The viscosity of the epoxy resin composition was measured at 60° C. at an interval of 30 minutes, and the time until the viscosity became $5 \times 10^4$ cp was measured.

Time for gelation

The epoxy resin composition was placed in a container at a temperature of 150° C. and then heated in an oil bath at 150° C., which was provided beforehand, and the time untill the composition was gelated was measured.

Viscosity change with lapse of time

The epoxy resin composition was plased in a container at a temperature of 60° C., and the whole batch was set in an oil bath at 60° C. The viscosity was then measured at an interval of 30 minutes, and its change with lapse of time was measured.

Crack index

By use of the epoxy resin composition, a crack resistance index was evaluated in accordance with IEC-recommended method (Publication 455-2).

Deflection temperature under flexural load (HDT)

By use of the epoxy resin composition, a test piece was prepared in accordance with ASTM-D 648, and then it was evaluated.

Sedimentation property

From the cured product of the epoxy resin composition, a test piece was sampled, and the sedimentation property of the specimen was measured by the "ashing method". The quantity of sedimentation was found from a difference between the measured ratio of filling (wt. %) and the theoretical ratio of filling (wt. %).

EXAMPLE 2

105 parts by weight of a heat-melted mixture obtained by melting under heat 5 parts by weight of polysulfone resin "P-1700" and 100 parts by weight of epoxy resin "GY-260", 95 parts by weight of the same condensation mixture as used in Example 1 above, 1 part by weight of zinc octylate, and 520 parts by weight of alumina powder were mixed and stirred under reduced pressure to thereby prepare an epoxy resin composition. The properties of the thus obtained composition and the properties of the cured product were measured in the same manner as in Example 1 above. The results are shown in the following Table 1 and graphical representation in the single FIG. 1 of the accompanying drawing.

EXAMPLE 3

110 parts by weight of a heat-melted mixture obtained by melting under 10 parts by weight of polysulfone resin "P-1700" and 100 parts by weight of an epoxy resin "GY-260", 95 parts by weight of a condensation mixture same as that used in Example 1 above, 1 part by weight of zinc octylate, and 530 parts by weight of alumina powder were mixed and stirred under reduced pressure to thereby prepare an epoxy resin composition. The properties of the thus obtained composition and the properties of the cured product were measured in the same manner as in Example 1 above. The results are shown in the following Table 1 and the graphical representation in the single FIG. 1 of the accompanying drawing.

COMPARATIVE EXAMPLE 1

100 parts by weight of an epoxy resin "CY-225" (a product of Ciba-Geigy AG), 80 parts by weight of a modified acid anhydride "HY-225" (a product of Ciba-Geigy AG) as the curing agent, and 460 parts by weight of alumina powder were mixed and stirred at 60° C. under reduced pressure to thereby prepare an epoxy resin composition. The properties of the thus obtained composition and the properties of the cured product were measured in the same manner as in Example 1 above. The results are shown in the following Table 1 and the graphical reparesentation in the single FIG. 1 of the accompanying drawing.

COMPARATIVE EXAMPLE 2

100 parts by weight of an epoxy resin "CY-225", 95 parts by weight of a curing agent obtained by adding 23% by weight of methyl tetrahydrophthalic anhydride (methyl-THPA) to the curing agent as used in Comparative Example 1 above, and 500 parts by weight of alumina powder were mixed and stirred at 60° C. under reduced pressure to thereby prepare an epoxy resin composition. The properties of the thus obtained composition and the properties of the cured product were measured in the same manner as in Example 1 above. The results are shown in the following Table 1 and the single FIG. 1 of the accompanying drawing.

In all the foregoing Examples and Comparaive Examples, the filling ratio of the filler in the epoxy resin composition was set at 44% by volume, and the amount of the curing agent relative to the epoxy resin was adjusted to be an equivalent ratio of 1.0 in Examples 1 to 3, while it was adjusted to be an equivalent ratio of 0.7 in Comparative Example 1, and an equivalent ratio of 0.9 in Comparative Example 2.

TABLE 1

|  | Reactivity | | | Properties of cured product | | |
|---|---|---|---|---|---|---|
|  | Initial viscosity (cp) | Useful working time (hr.) | Geling time (min.) | Crack index | HDT (°C.) | Sedimentation property (wt. %) |
| EXAMPLE No. | | | | | | |
| 1 | 11,500 | 5 over | 14 | 6 | 110 | −2.1 |
| 2 | 16,000 | 5 over | 17 | 9 | 108 | −1.6 |
| 3 | 19,000 | 5 over | 18 | 12 | 105 | −0.8 |
| Comparative Example | | | | | | |
| 1 | 20,000 | 3 | 20 | 4 | 95 | −16 |
| 2 | 15,000 | 3 | 18 | 3 | 105 | −20 |

The epoxy resin composition according to the present invention possesses excellent reactivity and curing property adapted to the pressure gelating method. In particular, it remarkably reduces sedimentation of the filling, material to take place at the stage of its pouring into the mold. It is also excellent in its heat resistant property, heat shock resisting property, high mechanical strength, dimensional stability, and various other properties. Further, it has a long useful working time at a low temperature and favorable property in respect of the storage stability.

Moreover, use of the epoxy resin composition according to the present invention makes it possible to reduce loss in the resin material to be brought about in the course of its production, hence an additional effect of realizing saving of the resources.

We claim:

1. An epoxy resin composition, consisting essentially of a heat-melted mixture obtained by mixing under heat 100 parts by weight of an epoxy resin having an epoxy equivalent of 200 or lower and 0.5 to 10 parts by weight of polysulfone resin; a curing agent; and an inorganic filler; said polysulfone resin having the formula (I):

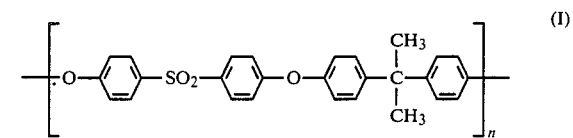

wherein n is an integer of from 50 to 80, and wherein said curing agent is a condensation mixture of 100 parts by weight of polybasic carboxylic acid anhydride and 40 to 60 parts by weight of bisphenol A having the formula (II):

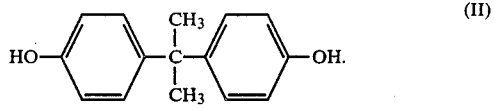

2. The epoxy resin composition according to claim 1, wherein said inorganic filling material is selected from the group consisting of alumina powder, hydrated alumina powder, quartz powder, and fused quartz powder.

3. The epoxy resin composition according to claim 2, wherein said inorganic filling material is alumina powder.

4. The epoxy resin composition according to claim 1, wherein said heat-melted mixture is obtained by mixing under heat in an inert gas atmosphere at a temperature of from 110°–180° C.

5. The epoxy resin composition according to claim 1, wherein said curing agent is prepared by mixing said polybasic carboxylic acid anhydride and said bisphenol A into a substantially uniform liquid at a temperature of from 110°–150° C. in an inert gas atmosphere.

6. The epoxy resin composition according to claim 1, wherein said polybasic carboxylic acid anhydride is one or more anhydrides selected from the group consisting of hexahydrophthalic anhydride, methylhexahydrophthalic anhydride, tetrahydrophthalic anhydride, and methyltetrahydrophthalic anhydride.

7. The epoxy resin composition according to claim 1, wherein said epoxy resin is selected from the group consisting of a bisphenol A epoxy resin, a bisyphenol F epoxy resin, a phenol-novolac epoxdy resin, cresol-novolac epoxy resin, cycloaliphatic diglycidyl ester epoxy resin, cycloaliphatic epoxy resin having an epoxy group in the ring thereof, epoxy resin containing a spiro ring therein and a hydantoin epoxy resin.

* * * * *

UNITED STATES PATENT AND TRADEMARK OFFICE
CERTIFICATE OF CORRECTION

PATENT NO. : 4,677,144
DATED : June 30, 1987
INVENTOR(S) : Kazuo YASUDA, et al

It is certified that error appears in the above-identified patent and that said Letters Patent is hereby corrected as shown below:

On the title page

Priority information was not printed on Letters Patent. Should read as follows:

July 18, 1985 [JP] .................... 159139

Signed and Sealed this

Twelfth Day of April, 1988

Attest:

DONALD J. QUIGG

Attesting Officer

Commissioner of Patents and Trademarks